(12) United States Patent
Craig

(10) Patent No.: US 7,093,360 B1
(45) Date of Patent: Aug. 22, 2006

(54) METHOD OF REMOVING BOILER TUBES

(76) Inventor: Merrill C. Craig, 4447 Needmore Rd., Riverside, OH (US) 45424

( * ) Notice: Subject to any disclaimer, the term of this patent is extended or adjusted under 35 U.S.C. 154(b) by 0 days.

(21) Appl. No.: 11/085,374

(22) Filed: Mar. 21, 2005

Related U.S. Application Data

(60) Provisional application No. 60/559,759, filed on Apr. 6, 2004.

(51) Int. Cl.
*B23P 6/00* (2006.01)

(52) U.S. Cl. ............... 29/890.031; 29/402.08; 29/402.11; 29/426.4; 29/426.6; 29/726; 29/726.5; 29/727; 408/1 R; 408/79; 408/80; 408/81; 408/82; 408/201

(58) Field of Classification Search ........... 29/402.08, 29/402.11, 426.4, 426.6, 726, 727, 890.031; 408/1 R, 79, 80, 81, 82, 201
See application file for complete search history.

(56) References Cited

U.S. PATENT DOCUMENTS

| | | | |
|---|---|---|---|
| 4,498,820 A * | 2/1985 | Brennan | 409/179 |
| 5,542,177 A * | 8/1996 | Hillestad | 29/890.03 |
| 5,826,334 A | 10/1998 | Weeks et al. | |
| 5,947,655 A * | 9/1999 | Ramsey | 408/80 |
| 5,974,642 A | 11/1999 | Weeks et al. | |
| 6,205,895 B1 * | 3/2001 | Schartinger et al. | 82/47 |
| 6,206,618 B1 * | 3/2001 | Ramsey | 408/80 |

* cited by examiner

*Primary Examiner*—Jack Keith
*Assistant Examiner*—Hung C. Le
(74) *Attorney, Agent, or Firm*—Mark A. Navarre

(57) ABSTRACT

Boiler tubes are removed from a boiler vessel without damaging the vessel by severing the boiler tube near the exterior periphery of the vessel, and using a piloted rotary cutting tool fixtured with respect to the longitudinal axis of the severed boiler tube to remove all but a very thin shell of the severed tube. The rotary cutting tool is then withdrawn, and the remaining thin shell of the boiler tube is manually peeled away from the periphery of the boiler vessel opening. In a preferred implementation, the rotary cutting tool is annular, and a tapered cylindrical pilot having an outside diameter slightly smaller than the inside diameter of the expanded portion of the boiler tube is retractably mounted within the annulus of the cutting tool.

4 Claims, 2 Drawing Sheets

METHOD OF REMOVING BOILER TUBES

This claims benefit of 60/559,759 filed Apr. 6, 2004.

TECHNICAL FIELD

The present invention relates to removing tubes from a fire tube or water tube boiler in connection with boiler maintenance and repair, and more particularly to a method by which the tubes may be quickly and easily removed without damaging the boiler drum.

BACKGROUND OF THE INVENTION

Fire tube and water tube boilers designed for commercial and industrial applications have two or more heavy duty drums or headers (collectively referred to herein as vessels) interconnected with numerous steel boiler tubes in the range of 2–3 inches in diameter. The boiler tubes are inserted through openings in the boiler vessel, welded to the exterior periphery of the vessel, expanded against the circumference of the openings, and flared or beaded against the vessel on the inner periphery of the openings. Over the life of the boiler, the boiler tubes may be removed and replaced up to five or six times incident to either repair or routine maintenance.

Boiler tube removal is usually achieved by cutting off the tubes close to the exterior periphery of the boiler vessel, heating and/or notching the tube stub with a torch, and forcibly driving the tube out of engagement with the vessel. This typically damages the boiler vessel openings, which must then be repaired before installation of replacement boiler tubes. Another possible technique, described in the U.S. Pat. No. 5,974,642 to Weeks et al., is to use a special purpose cutting tool to slit the boiler tube stub throughout its entire length and thickness, and then radially compress the tube end to close the slit and force the tube walls out of engagement with the boiler vessel opening, whereafter the tube stub is withdrawn from the opening. While this technique adequately addresses the problem of tube removal damage, it necessarily involves a considerable expense for the special purpose cutting tools, and has not gained widespread acceptance in the boiler repair industry. Accordingly, what is needed is a simple and cost-effective way of removing boiler tubes without causing boiler vessel damage.

SUMMARY OF THE INVENTION

The present invention provides a new and improved method for removing boiler tubes from a boiler vessel without damaging the vessel. In practicing the invention, the boiler tube to be removed is severed near the exterior periphery of the boiler vessel, and a piloted rotary cutting tool fixtured with respect to the longitudinal axis of the severed boiler tube is used to remove all but a very thin shell of the severed tube. Preferably, the remaining shell has a thickness in the range of 0.015 inch to 0.030 inch. The rotary cutting tool is then withdrawn, and the remaining thin shell of the boiler tube is manually peeled away from the periphery of the boiler vessel opening. In a preferred embodiment, the rotary cutting tool is annular, and a closed cylindrical pilot that has an outside diameter slightly smaller than the inside diameter of the expanded portion of the boiler tube is received within the annulus of the cutting tool. Preferably, the piloting cylinder is tapered on its leading end, and is retractably mounted within the annulus of the cutting tool so that it will retract into the body of the cutting tool as it contacts the un-expanded portion of the boiler tube during the cutting procedure.

DESCRIPTION OF THE PREFERRED EMBODIMENT

Figure 1:
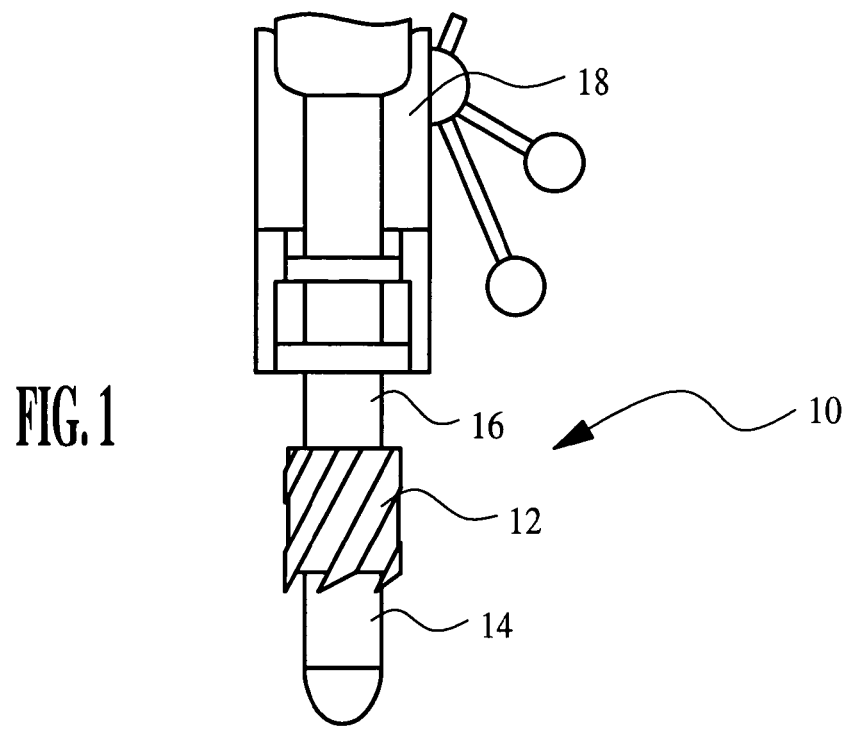
FIG. 1 is a side view of the piloted annular rotary cutting tool of this invention secured in a drill press.

Referring to the drawings, the reference numeral 10 generally designates a piloted annular rotary cutting tool, including an annular rotary cutting tool 12 and a cylindrical bullet-nosed pilot 14 that is partially received within the annulus of the rotary cutting tool 12. The cutting tool 12 has a cutting diameter that is 0.015 inch to 0.030 inch smaller than the diameter of a boiler tube opening, and the pilot 14 has a primary outside diameter that is slightly smaller than the inside diameter of the expanded portion of the boiler tube. The rotary cutting tool 12 may be an industrial rotary cutting tool, such as manufactured and marketed by Hougen Manufacturing, Inc, in Swartz Creek, Mich., and has a shank extending from its base for securing the cutting tool 12 in a rotary drill.

In a preferred embodiment, the pilot 14 is retractably mounted within the cutting tool 12 so that it will retract into the body of the cutting tool 12 as it contacts an un-expanded portion of the boiler tube during boiler tube removal. For example, the pilot 14 may be spring biased to an extended position as shown in FIG. 1, and when the pilot 14 comes into contact with an un-expanded portion of the boiler tube during boiler tube removal, the pilot 14 will retract, compressing the internal spring. Alternatively, the pilot 14 may be fixedly secured within the rotary cutting tool 12, in which case the portion of the pilot 14 extending out of the cutting tool annulus may be slightly larger than the portion received within the cutting tool annulus. With a fixed pilot, the cutting tool 12 may be withdrawn from the boiler tube when the pilot 14 comes into contact with an un-expanded portion of the boiler tube, at which point the pilot 14 may be removed, and the cutting tool re-inserted into the partially drilled opening.

Figure 2:
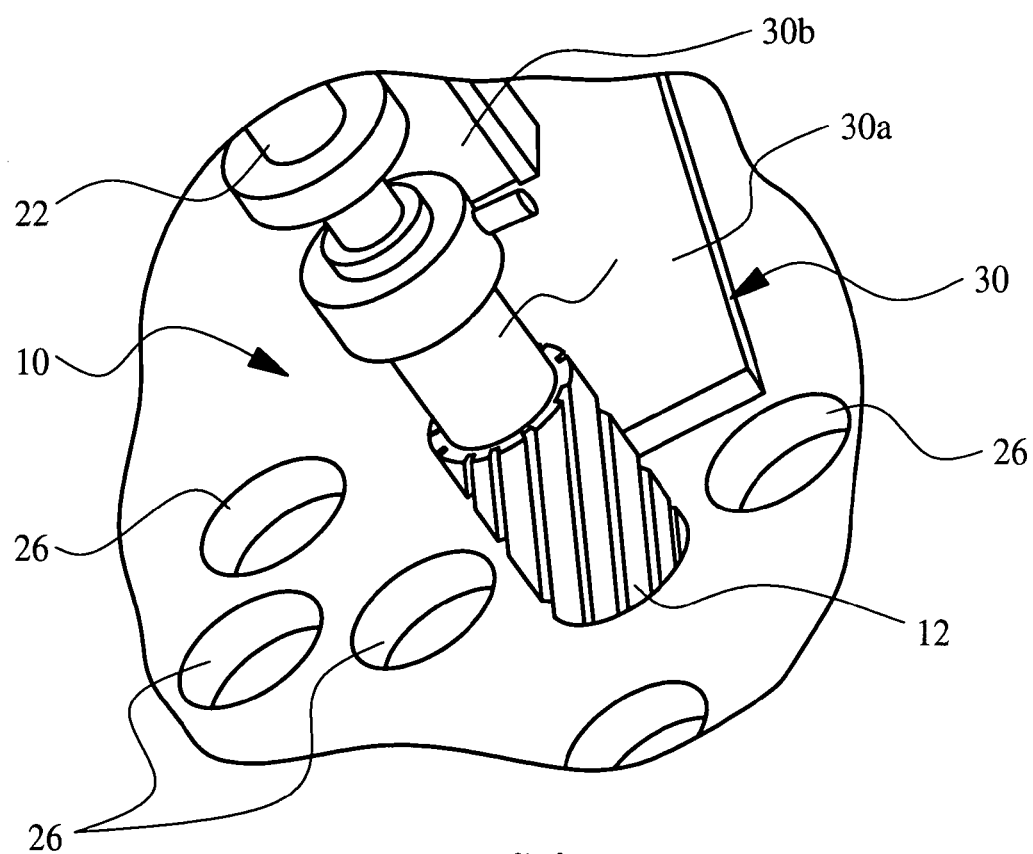
FIG. 2 is a first isometric view of the cutting tool of FIG. 1, secured in the chuck of a fixtured rotary drill and partially inserted into a boiler tube opening according to the method of this invention.
Figure 3:
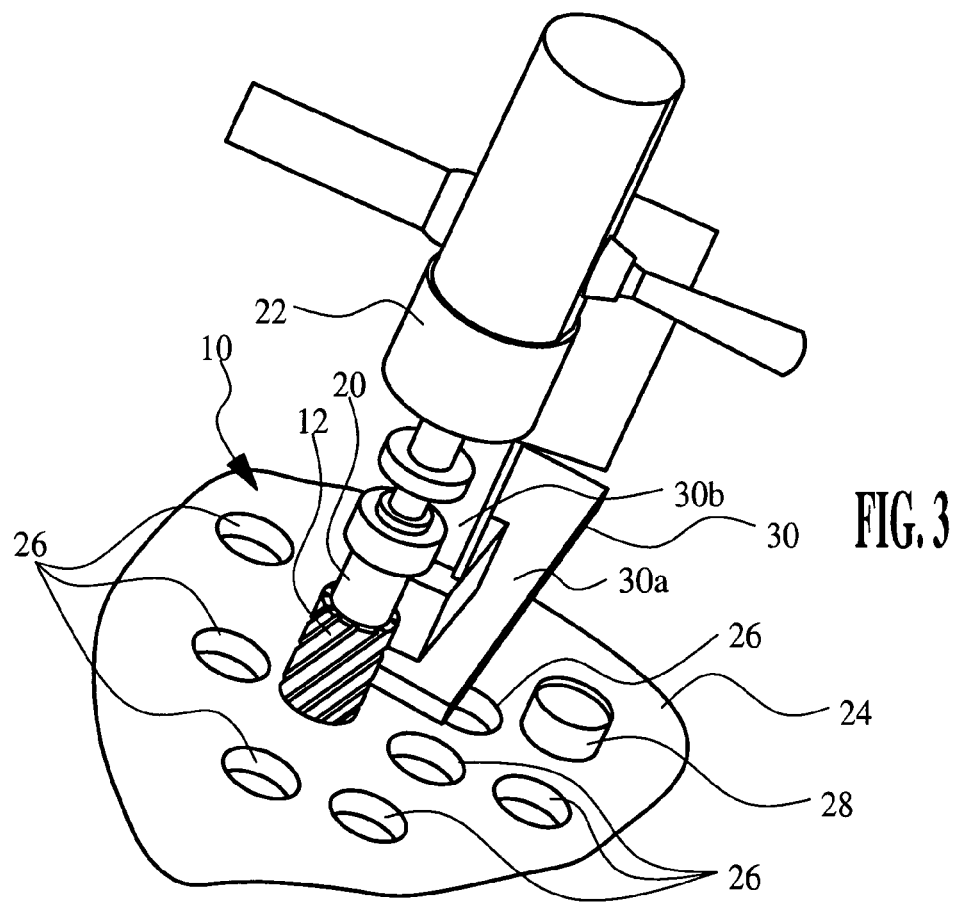
FIG. 3 is a second isometric view of the cutting tool of FIG. 1, secured in the chuck of a fixtured rotary drill and partially inserted into a boiler tube opening according to the method of this invention 2.
Figure 4:
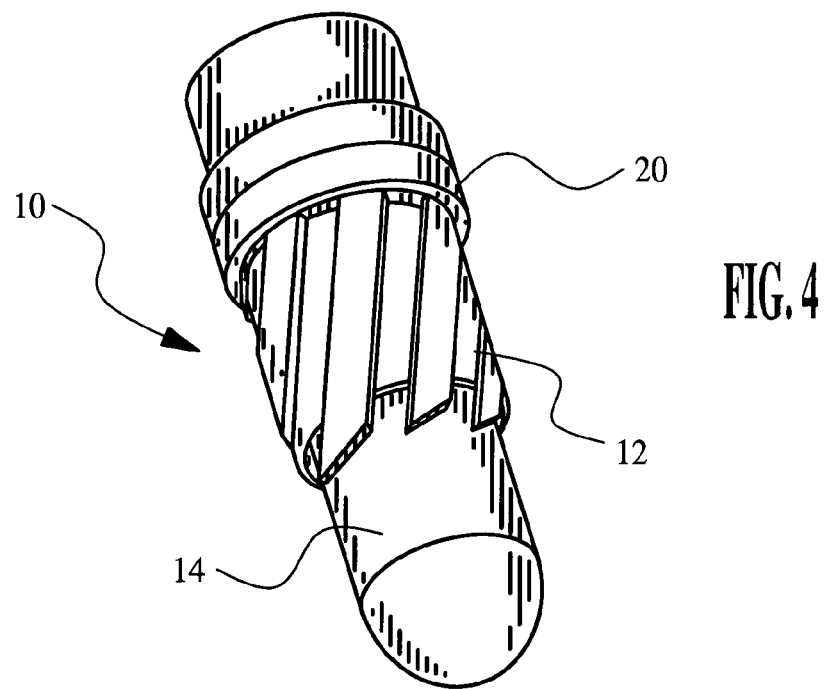
FIG. 4 is an isometric end view of the piloted annular rotary cutting tool of this invention.

In FIG. 1, the piloted rotary cutting tool 10 is secured in the chuck 16 of a drill press 18. In FIGS. 2–4, the piloted rotary cutting tool 10 is secured in the chuck 20 of an industrial rotary drill 22. FIGS. 2–3 also depict a portion of a boiler vessel 24 having several boiler tube openings 26 from which a used boiler tube has been removed. An un-removed boiler tube stub is designated by the reference numeral 28 in FIG. 3. FIGS. 2–3 also depict a fixture 30 having a foot or bottom plate 30*a* that registers with two or more of the boiler tube openings 26, and a bracket 30*b* to which the drill 22 is secured. The fixture 30 axially positions the piloted cutting tool 10 over a boiler tube stub 28, and the operator lowers the pilot 14 into the stub 28 to ensure exact positioning of the cutting tool 12.

The method of this invention involves severing the boiler tube to be removed, leaving a stub 28, positioning the drill 22 and fixture 30 so that the piloted cutting tool 10 is centered over the longitudinal axis of the stub 28, lowering the piloted cutting tool 10 to allow the pilot 14 to penetrate the inside diameter of the severed stub 28, activating the drill 22 to rotate the piloted cutting tool 10, and advancing the piloted cutting tool 10 into the stub 28 so that the cutting tool 12 drills into the stub 28, removing all but a thin shell in the range of 0.015 inch to 0.030 inch of the severed boiler pipe 28. When the cutting tool has drilled completely through the stub 28, the piloted cutting tool 10 is retracted from the opening 26, and the remaining thin shell of boiler pipe is manually peeled away from the inner periphery of the boiler opening 26, completing the removal process. In cases where the pilot 14 is fixedly secured to the cutting tool 12 and the pilot 14 comes into contact with an unexpanded portion of the severed boiler tube 28 during the drilling step, the method will also include the steps of retracting the piloted cutting tool 10 from the partially drilled stub 28, removing the pilot 14 from the cutting tool 12, and re-inserting the cutting tool 12 into the partially drilled stub 28.

The apparatus of this invention is simple and very inexpensive compared to special purpose cutting tools. The method of this invention allows quick and easy removal of used boiler tubes without causing significant heating of the vessel 24, and without damaging or distorting the inner periphery of the openings 26.

While the present invention has been described with respect to the illustrated embodiment, it is recognized that numerous modifications and variations in addition to those mentioned herein will occur to those skilled in the art. For example, a non-annular rotary cutting tool may be used in place of the illustrated annular cutting tool, and the cutting tool may be powered by an electric, pneumatic or hydraulic drive, and attached to a drilling platform with magnetic systems, mechanical lock down systems or tracking systems, and so on. Accordingly, it is intended that the invention not be limited to the disclosed embodiment, but that it have the full scope permitted by the language of the following claims.

The invention claimed is:

1. A method of removing a boiler tube that extends through and is retained in an opening in a boiler vessel, the method comprising the steps of:

severing the boiler tube near an exterior periphery of the boiler vessel;

centering a rotary cutting tool with respect to a longitudinal axis of the severed boiler tube, the cutting tool having a cutting diameter that is larger than an inside diameter of said boiler tube but smaller than a diameter of said opening;

advancing the rotary cutting tool into the boiler tube to remove all but a thin shell of said boiler tube;

retracting the rotary cutting tool out of the boiler tube; and peeling said thin shell of said boiler tube away from an inner periphery of said opening.

2. The method of claim 1, wherein the cutting diameter of said cutting tool is sized relative to the diameter of said opening such that said thin shell has a thickness in the range of about 0.015 inch to about 0.030 inch.

3. The method of claim 1, including the steps of:

affixing a cylindrical pilot to said rotary cutting tool, said pilot having an outside diameter slightly smaller than the inside diameter of said boiler tube; and advancing said pilot into said boiler tube ahead of said rotary cutting tool.

4. The method of claim 1, wherein a portion of said boiler tube is radially expanded against an inner periphery of said opening to secure said boiler tube in said opening, and the method includes the steps of:

affixing a cylindrical pilot to said rotary cutting tool, said pilot having an outside diameter slightly smaller than an inside diameter of the radially expanded portion of said tube;

advancing said pilot into said boiler tube ahead of said rotary cutting tool;

advancing the rotary cutting tool into the boiler tube and partially drilling into said boiler tube until said pilot contacts an un-expanded portion of said boiler tube;

retracting the rotary cutting tool out of the boiler tube and removing said pilot; and advancing said cutting tool back into said boiler tube to complete the removal of all but said thin shell.

* * * * *